(12) United States Patent  (10) Patent No.: US 7,950,519 B2
DeVries et al.  (45) Date of Patent: May 31, 2011

(54) BELT SCRAPER ASSEMBLY AND SCRAPER BLADE THEREOF

(75) Inventors: Brett E. DeVries, Comstock Park, MI (US); Daniel Kuiper, Alto, MI (US); George M. Tramper, Pierson, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 17 days.

(21) Appl. No.: 12/434,327

(22) Filed: May 1, 2009

(65) Prior Publication Data

US 2009/0272625 A1 Nov. 5, 2009

Related U.S. Application Data

(60) Provisional application No. 61/050,170, filed on May 2, 2008.

(51) Int. Cl.
*B65G 45/16* (2006.01)
(52) U.S. Cl. ......................................... 198/499; 198/497
(58) Field of Classification Search .................. 198/497, 198/499
See application file for complete search history.

(56) References Cited

U.S. PATENT DOCUMENTS

| 4,489,823 | A | | 12/1984 | Gordon | |
|---|---|---|---|---|---|
| 5,197,587 | A | * | 3/1993 | Malmberg | 198/497 |
| 5,213,197 | A | | 5/1993 | Mohri | |
| 5,573,102 | A | * | 11/1996 | Puchalla | 198/497 |
| 5,692,595 | A | * | 12/1997 | Gilbert | 198/499 |
| 5,975,281 | A | | 11/1999 | Yoshizako et al. | |
| 6,581,754 | B2 | | 6/2003 | Law | |
| 6,619,469 | B2 | * | 9/2003 | Malmberg | 198/497 |

FOREIGN PATENT DOCUMENTS

DE 195 08 090 A1 9/1996

* cited by examiner

*Primary Examiner* — James R Bidwell
(74) *Attorney, Agent, or Firm* — Fitch Even Tabin & Flannery

(57) ABSTRACT

A belt scraper assembly having a blade holder and a scraper blade disposed therein, wherein a stiffener extending in a longitudinal direction with respect to the belt is provided in the blade body to resist bending of the blade. A scraper blade having a body with a rigid plate member connected thereto and a stiffener disposed in the body of resilient material above a base portion and below a tip portion of the plate member and extending generally transversely with respect to the length of the scraper body. A scraping assembly for a conveyor belt including a non-linearly contoured blade holder and a scraper blade with a stiffener disposed on the plate members between base and tip portions extending generally transversely with respect to the length of the plate including a force-transmitting interface between the stiffener and an inner surface of the rear wall of the blade holder such that the inner surface of the wall offers support to the stiffener to oppose bending of the scraper blade caused by scraping the belt.

22 Claims, 9 Drawing Sheets

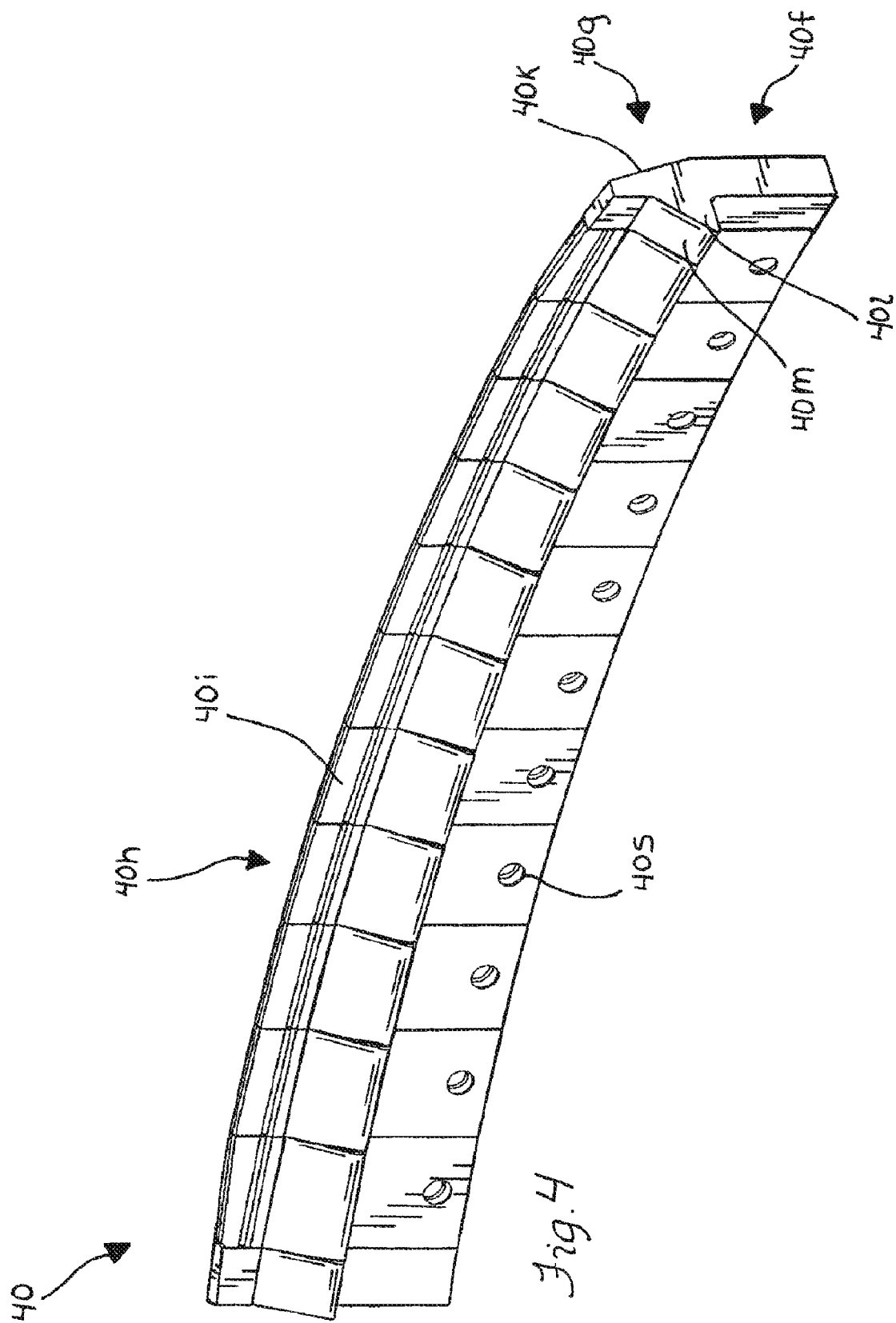

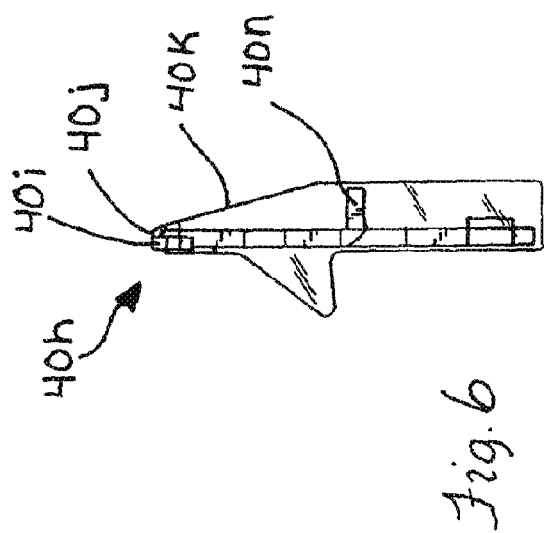
Fig. 6
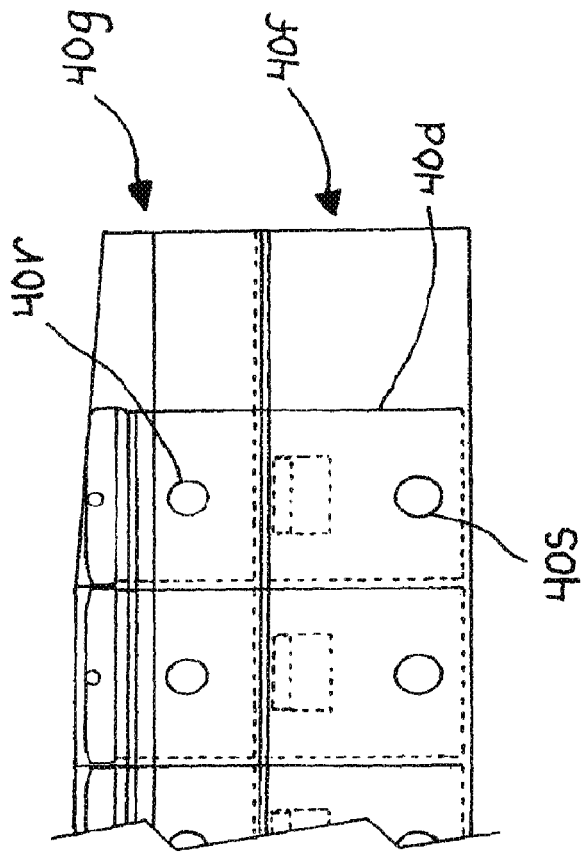
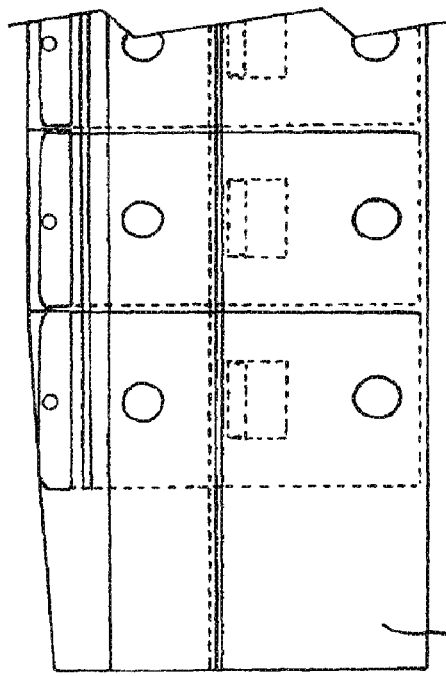
Fig. 5

BELT SCRAPER ASSEMBLY AND SCRAPER BLADE THEREOF

FIELD OF THE INVENTION

The invention relates to a belt scraper assembly for conveyor belts and, more particularly, to a scraper blade and blade holder therefor.

BACKGROUND OF THE INVENTION

Belt cleaning systems for conveyors that utilize a scraper blade to remove debris and other materials from conveyor belts are well known. These conveyor belts often include metallic splices extending across the belt that run past the scraper blades during conveyor belt operations. The scraper blades are typically biased into engagement with the belt to allow them to scrape leavings off of the belt and yet resiliently shift away from the belt when surface irregularities on the belt are encountered such as due to the aforementioned metallic splices.

Generally, the goal of keeping the scraper blade in substantially constant contact with the belt to improve cleaning thereof is in competition with the need to allow the blades to shift away from the belt to avoid taking the full brunt of impacts with metallic splices and the like which can cause the scraper blades to rapidly wear. In heavier duty applications, this problem can be exacerbated by the use of thicker, more robust fasteners which create higher impact loads on the cleaning blade.

Cleaners that have an arcuate or "U" shape are known in the art, such as disclosed in U.S. Pat. No. 5,978,281. Such cleaners are adapted to operate on the underside of a conveyor belt to scrape carry-back or leftover materials that remain stuck to the belt after transfer of the bulk material. The arcuate shape of the blade helps maintain contact between the blade and the belt to maximize cleaning efficiency near the center of the belt, where most of the cleaning is required.

The blade of the '281 patent is comprised of a plurality of metal plates having scraping portions held together with a resilient member, which connects the supporting members and allows the band to be formed into the shape of the blade holder which is carried rearwardly in the downstream return travel direction of the belt. The resilient member has a lower leg portion that may be inserted into a holding groove of the blade holder. An extended standing portion projects from the holding groove and contacts the belt and includes a downstream head portion formed by a gradual thickening of the extended standing portion in the downward and rearward directions so that the upper portion of the resilient member including the standing portion and head portion thereof has a generally wedge-shaped configuration. Notably, a jaw is formed at the downstream side of the head portion, so that there is a lower, transverse shoulder surface extending between the scraper head and specifically the jaw portion thereof, and the narrow, lower leg portion with the shoulder surface which contacts and covers over the downstream or rear side wall of the holder. This jaw is described as preventing biased abrasion of the scraping portion by supporting the extended standing portion against the moment produced toward the return travel direction of the belt during operation. Biased abrasion, or abrasion of the belt by the scraper tip at an angle other than perpendicular, is not preferred, because it is less effective for cleaning the belt.

However, due to tolerances in the manufacturing process of the blade, the blade holder, and other factors in the installation and operation of a scraper in accordance with the '281 patent, the jaw often may not operate effectively to prevent biased abrasion. Specifically, the overhanging jaw portion must be in contact with the top surface of the downstream side wall of the holder in order to support the extended standing portion against the moment produced by abrasion of the belt. Small discrepancies in the location of the jaw portion on the blade, the height of the downstream side wall, or the length of the leg portion may cause a gap to be present between the jaw portion and the downstream side wall of the holder. In addition, residue of scraped-off material may become deposited in the holder over time, causing the entire blade to sit higher in the holder, thus lifting the jaw portion out of contact with the holder wall.

In addition, the blade disclosed in the '281 patent has a rubber sheet that is bonded to the blade with the rubber sheet including a skirt portion that extends over a wall of the blade holder. The rubber sheet guides material that has been scraped from the belt along the sheet and toward the outer side of the holding wall of the holder to prevent the material from becoming lodged in the holding groove of the blade holder. Over time, the rubber sheet tends to wear down and may fall off once the bond between the rubber sheet and the blade is broken. Once the rubber sheet comes loose from the blade, scraped material may bond in and around the area between the scraper blade and the blade holder, making it extremely difficult to remove the scraper blade from the holder when the blade is ready for replacement.

The process of adhering the rubber sheet has certain disadvantages, such as the increased time, labor, and materials. The rubber sheet is made prior to the manufacture of the main body of the blade, including the molding of the resilient member to the metal support members. To affix the rubber sheet to the blade, an adhesive layer is applied to the upstream side of the metal support members and the upper portion of the rubber sheet is applied to the adhesive layer. The metal support members and rubber sheet are then disposed in a die and rubber is introduced into the die to form the resilient member and capture the support members therein.

Another issue with prior art blades is that the blade tips may fracture due to stresses imposed during the manufacturing process. In particular, a carbide blade tip may be fixed to the tip of a rigid steel plate using a brazing process. As the rigid plate is subject to heat, thermal expansion occurs in the plate, and as the plate cools after the carbide tip has been brazed to the plate, the plate contracts and may subject the tip to large stress concentrations. As the carbide tip is brittle in comparison with steel, the tip may crack due to the stresses caused by the contraction of the plate. Such cracking increases cost and manufacturing time and can cause the blade to perform poorly.

SUMMARY OF THE INVENTION

In accordance with the present invention, a belt scraper assembly for cleaning a conveyor belt is provided. The belt scraper assembly includes a blade holder for holding a scraper blade in contact with a conveyor belt for cleaning the belt. The blade holder has front and rear walls that are spaced generally in a longitudinal belt travel direction from each other. The scraper blade has a body of resilient material sized and configured for being received in the blade holder between front and rear walls of the holder. A stiffener in the blade body of a stiffer material than the resilient blade body material extends in a longitudinal direction to resist bending of the resilient scraper blade body during scraping of the belt.

The blade tip preferably addresses the belt at a perpendicular angle, which is generally the most efficient position for cleaning the belt. However, as the blade contacts the belt, the belt exerts a force on the blade in a return direction, causing the blade to bend in the return direction. This bending causes the blade tip to angle backwards, which reduces the cleaning efficacy of the blade. Accordingly, the stiffener provided in the blade body increases the stiffness of the blade to keep the blade tip from bending excessively in a return direction. In one form, the scraper blade includes a plate member disposed on or within the blade body and the stiffener is connected to the plate member. The stiffener may be a tab portion of the plate member bent in the longitudinal direction.

Preferably, the stiffener is a metallic member disposed in the blade body so that when the blade is received in the holder, the metallic stiffener member is in the holder adjacent the upper ends of the holder walls. In this manner, the stiffener acts to resist the transverse forces and the rearward bending of the upper portion of the blade body exposed beyond the upper ends of the holder walls. By extending transversely in the holder adjacent the upper ends of the walls, the stiffener keeps the blade body upper portion from bending backwards excessively over the upper end of the rear wall of the holder.

In one form according to the present invention, the blade body includes an upper portion, such as a protruding ridge that extends beyond the holder walls when the blade is received in the holder. The upper portion also includes an inclined, rear surface that does not protrude rearwardly beyond the rear wall of the holder. The protruding ridge portion directs scraped material away from the holder and keeps scraped material from depositing at the interface between the scraper blade body and the blade holder. Such deposits are undesirable because they may cause the blade to become lodged within the blade holder, making it very difficult to replace the blade.

The blade holder may be rigid and extend across the conveyor belt toward either side thereof. In a preferred form, the blade holder has a non-linear contour, such that the contour departs from a transverse orientation with respect to the belt at least partially along a length of the support member, although it is also contemplated that the scraper blade herein can be used with straight or linearly extending blade holders. In one preferred form, the blade holder has an arcuate contour or a U-shape, such that the blade holder curves in the return direction. In this configuration, the side walls follow the arcuate contour and remain spaced apart throughout a length of the holder, such that the scraper blade may be inserted between the side walls. In one form, the scraper blade is flexible, such that the scraper blade will be flexed into the curved contour of the blade holder. In other forms, the blade may be pre-shaped into the appropriate form to fit within the blade holder.

The scraper blade preferably includes a plate member connected to the blade body for providing structural rigidity to the blade body. A plurality of plate members may be disposed on or within the resilient blade body to increase the rigidity of the blade. In one form, the plates are aligned in a row and are embedded within the blade body so that the resilient material is disposed along both forward and rearward surfaces of the plates. A small gap between each plate allows the blade to flex and take the form of the blade holder. In one form, an aperture is disposed on the plate member such that the resilient material may pass through the plate member during manufacture thereof to better secure the plate member embedded within the resilient material of the blade body. The resilient material, such as a rubber compound, may have a liquid or flowable state when inserted into a die or mold for forming the blade body. The aperture in the plate member allows the resilient material to flow through the plate to the other side of the blade and thereby promotes even distribution of the material throughout the die. In another form, an aperture may be provided in the plate for accepting a protrusion of the die for aligning the plate within the die.

The blade tip may be fixed to the plate by various methods, such as brazing. Brazing may cause stress concentrations, due to the thermal expansion of the plate and blade tip, and subsequent contraction thereof during cooling. Thus, in another form in accordance with the invention, the plate member has a notch or gap disposed in an upper portion of the plate extending from an upper edge of the plate towards a lower edge of the plate to help alleviate stresses in the plate and the blade tip, which may form during fabrication of the scraper blade. In one form, a blade tip, such as one made of carbide, is connected to an upper portion of the plate and extends across the gap disposed in the plate.

BRIEF DESCRIPTIONS OF THE DRAWINGS

To understand the present invention, it will now be described by way of example, with reference to the accompanying drawings in which:

FIG. 4 is front perspective view of the scraper blade of FIG. 3 in a flexed or biased configuration;

FIG. 5 is a front view of a scraper blade in accordance with the present invention illustrating the layout of the plate members in the scraper blade body;

FIG. 6 is a right side view of the scraper blade of FIG. 5 with the resilient blade body portion shown as transparent to illustrate the plate member and stiffener disposed in the resilient blade body;

DETAILED DESCRIPTION OF PREFERRED EMBODIMENTS

Figure 1:
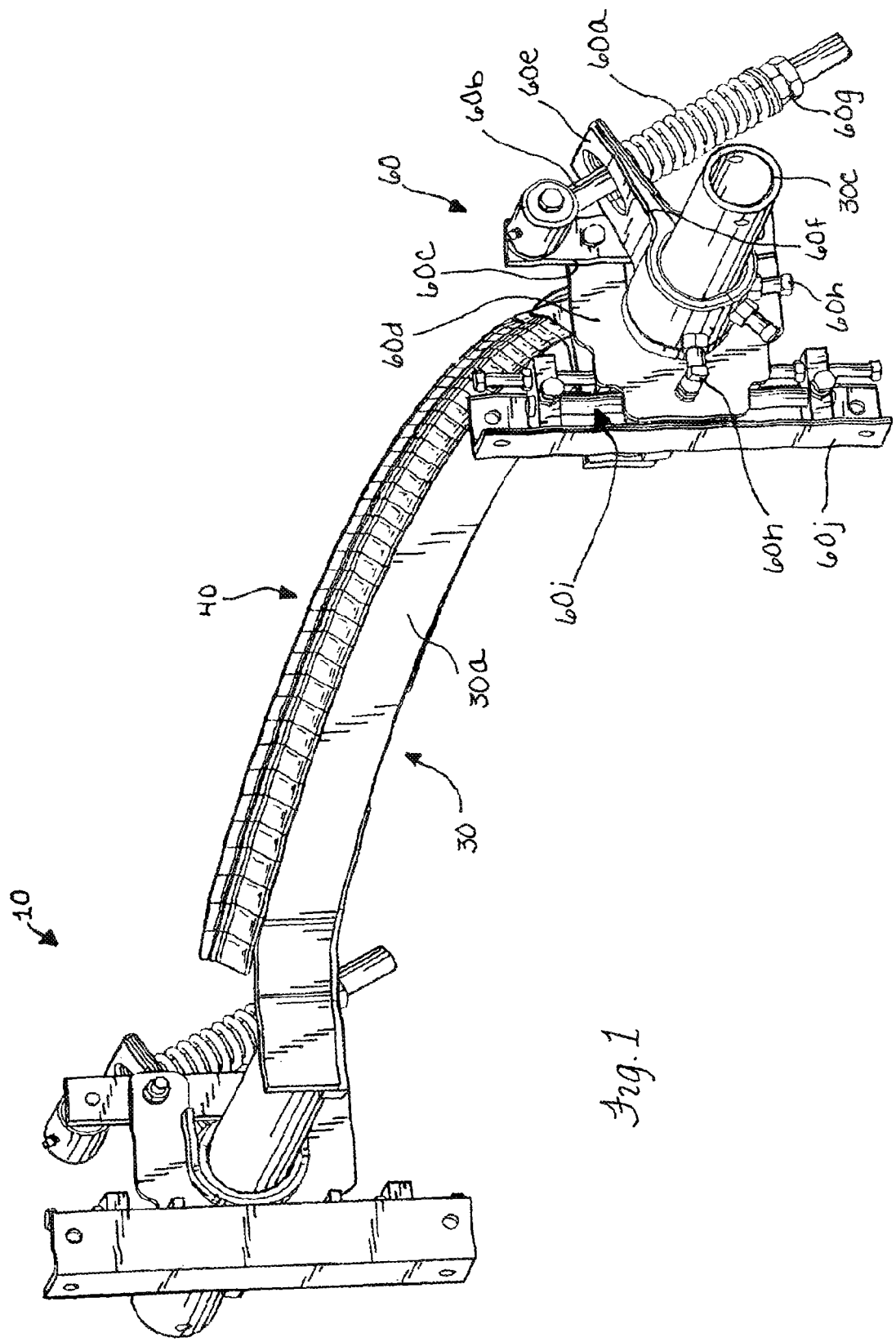
FIG. 1 is an front perspective view of a belt scraper assembly according to the present invention showing an upstream or front side of the assembly.
Figure 2:
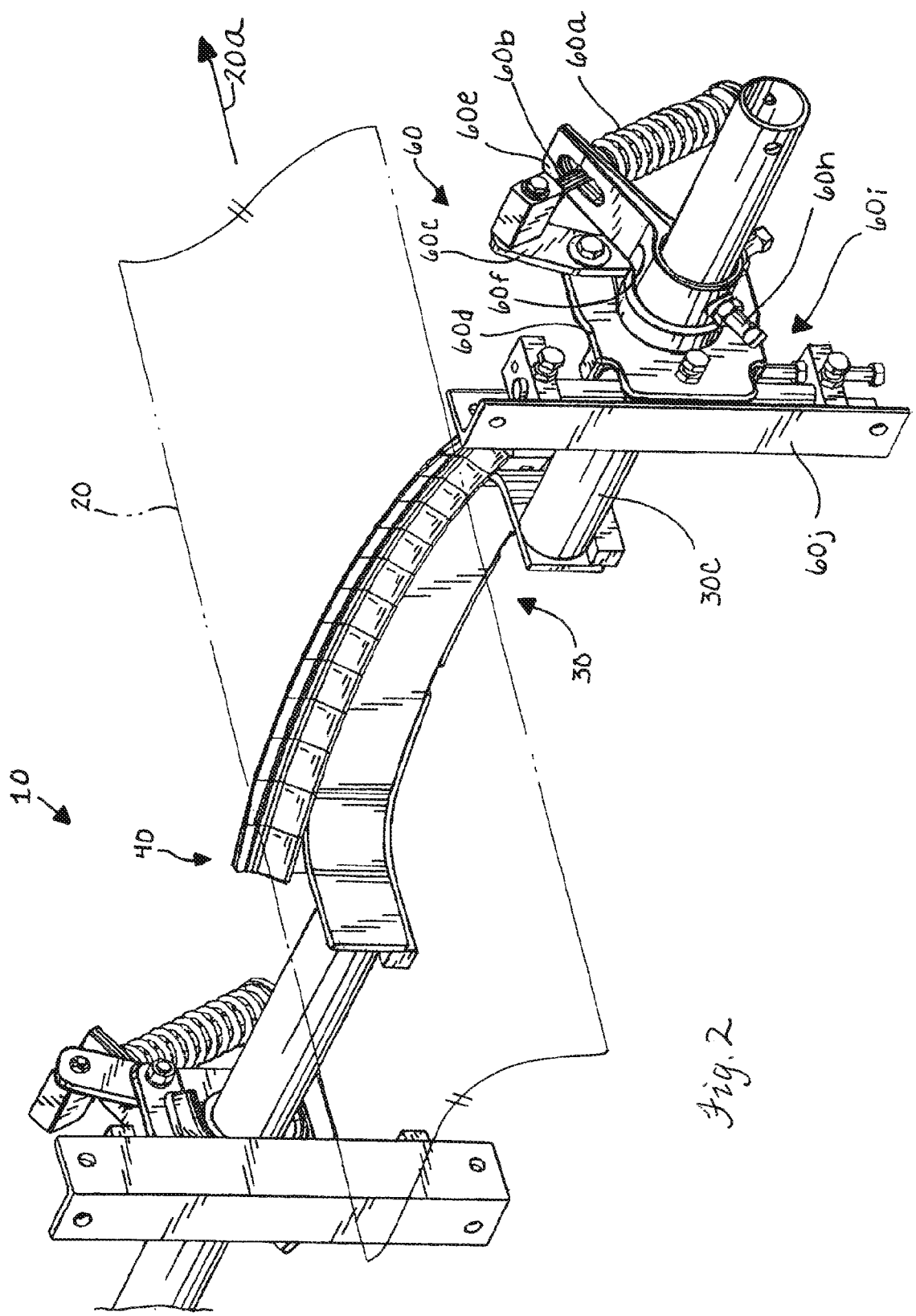
FIG. 2 is a front perspective view of an alternate form of a belt scraper assembly in accordance with the present invention illustrating the presence of the belt.
Figure 3:
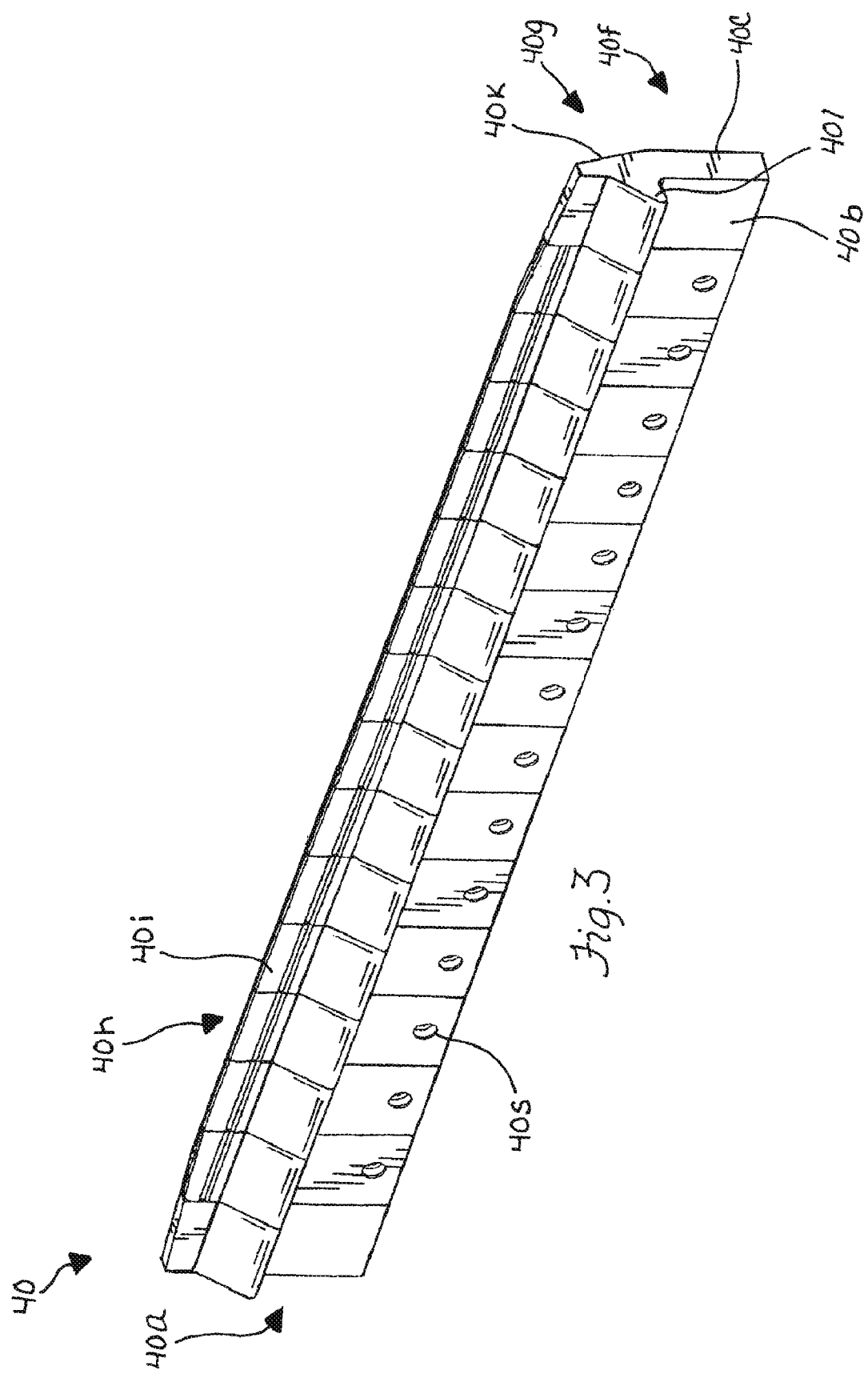
FIG. 3 is front perspective view of a scraper blade in accordance with the present invention showing an upstream or front side of the blade.
Figure 7:
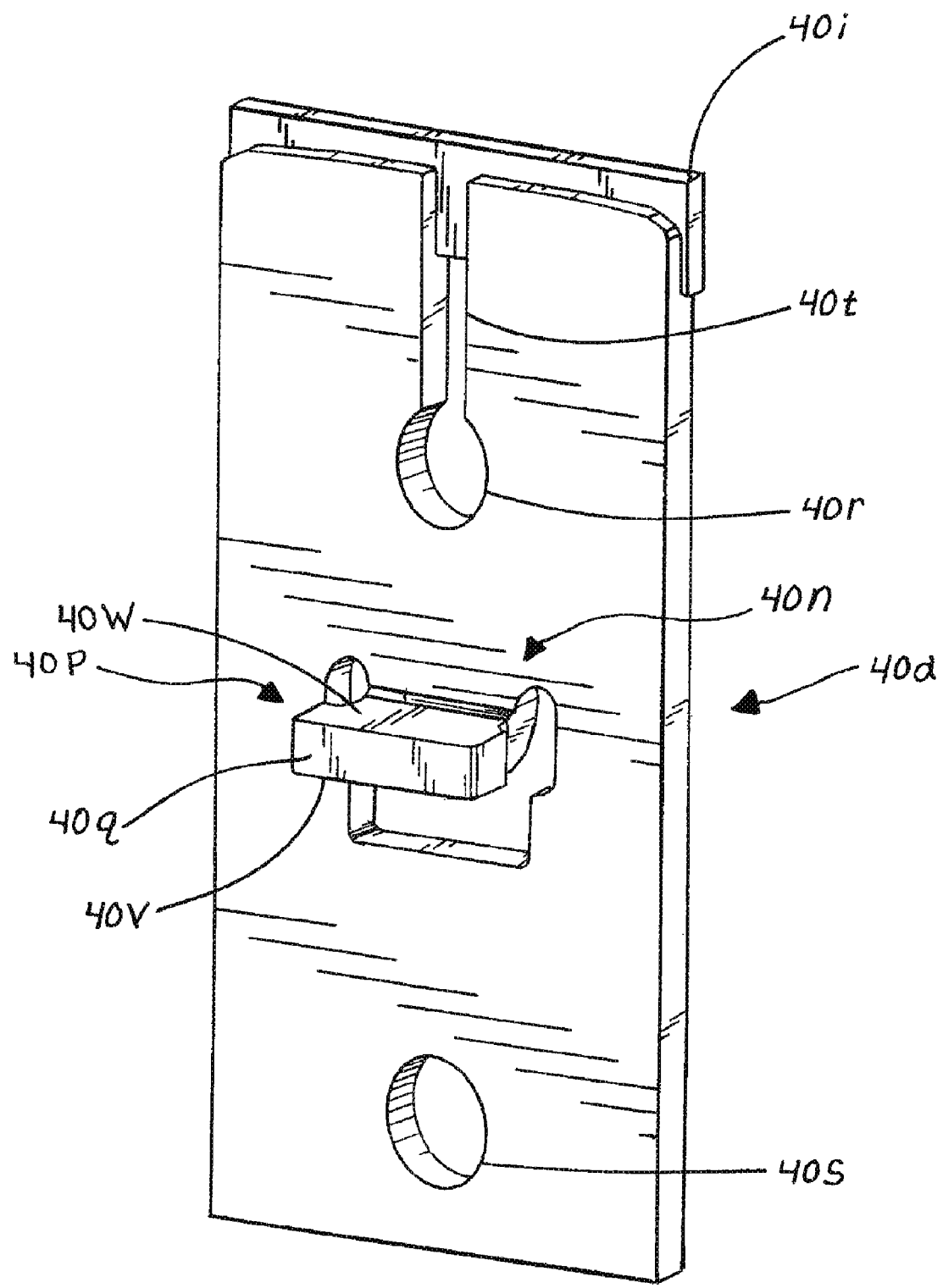
FIG. 7 is rear perspective view of a plate member in accordance with the present invention showing, inter alia, a stiffener in the form of a bent tab of the plate and a notch in the upper portion of the plate.
Figure 8:
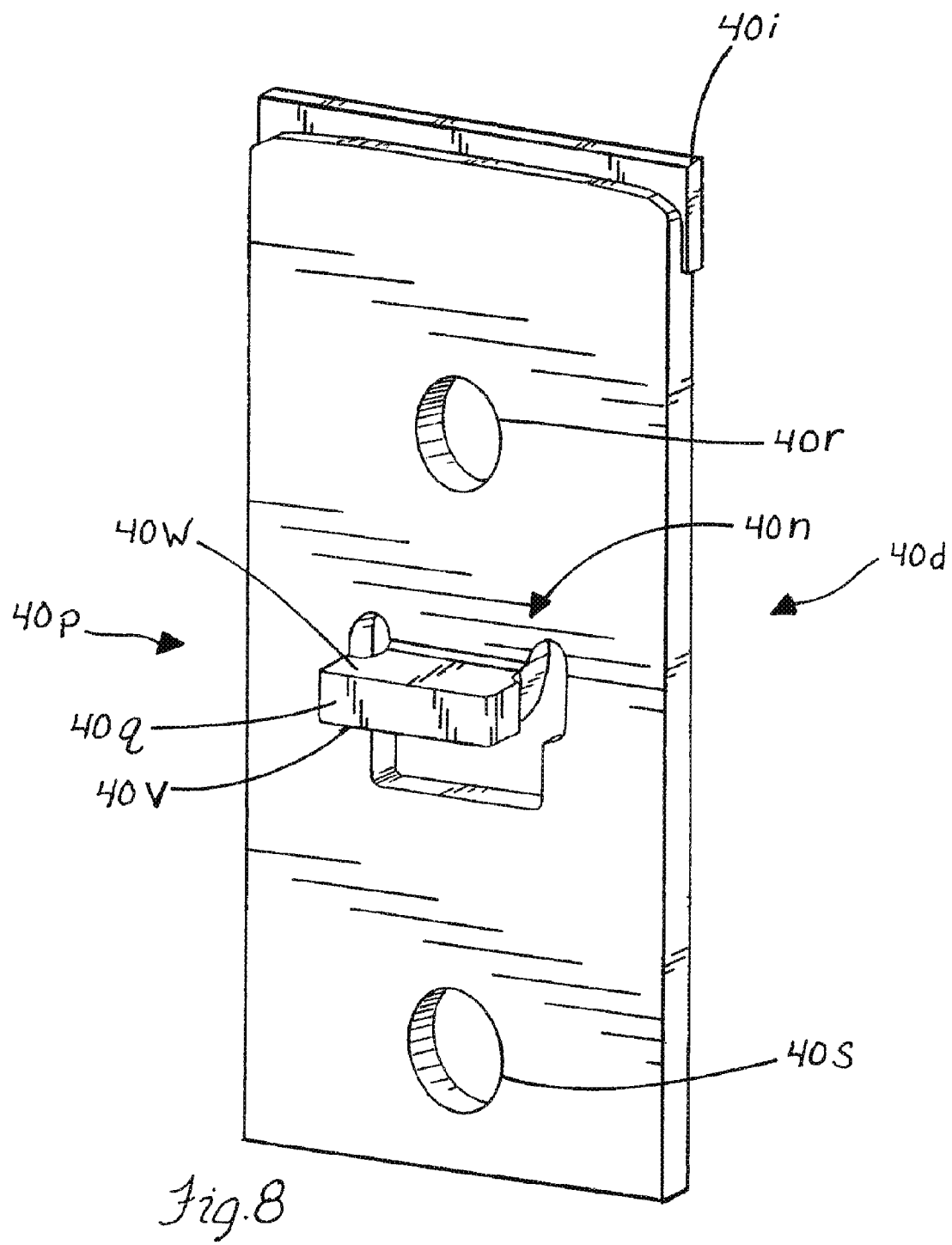
FIG. 8 is a rear perspective view of an alternate form of a plate member in accordance with the present invention.
Figure 9:
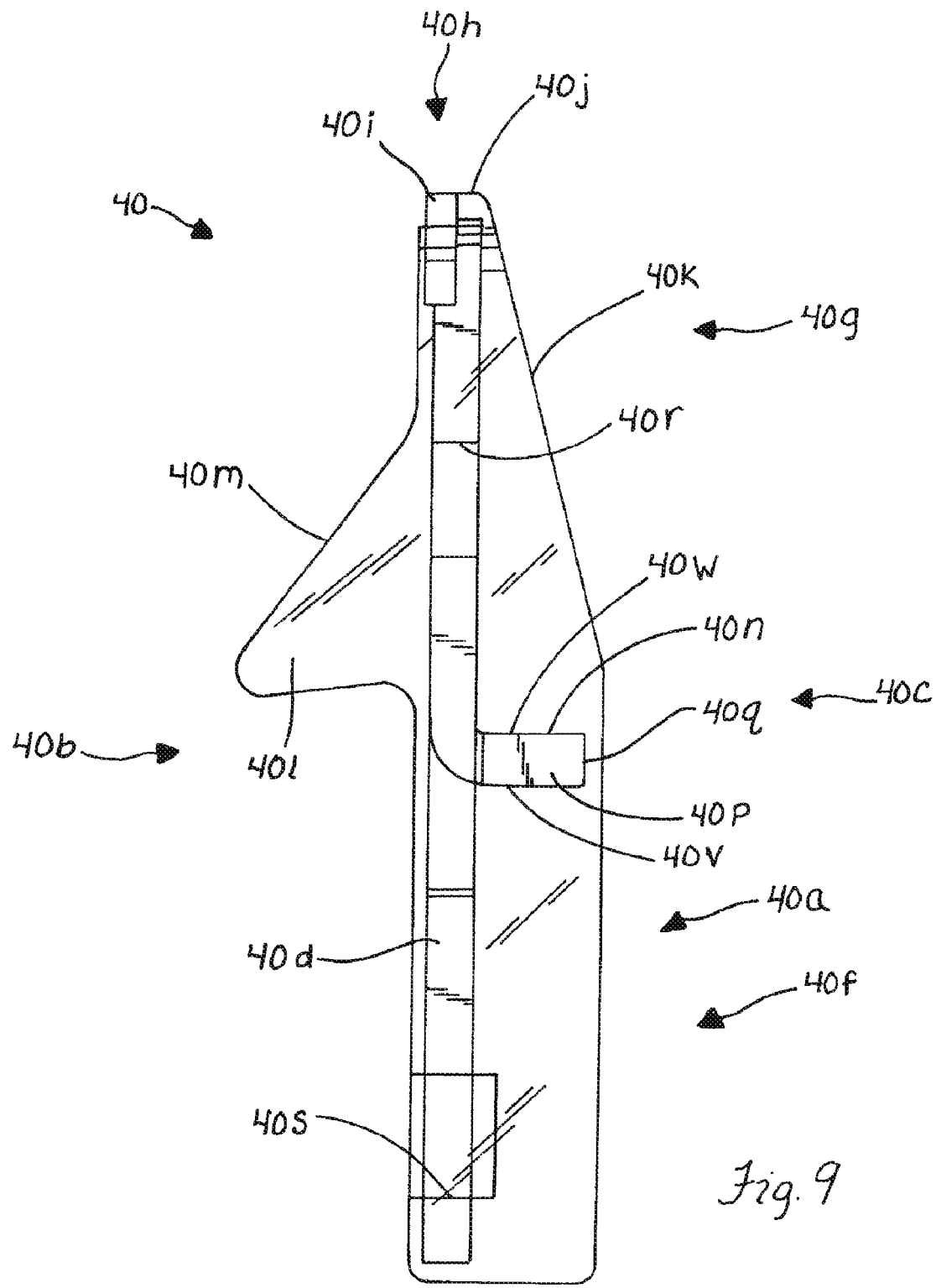
FIG. 9 is an enlarged right side view of a segment of the scraper blade of FIG. 5 with the resilient blade body portion shown as transparent to illustrate the plate member and stiffener disposed in the resilient blade body.
Figure 10:
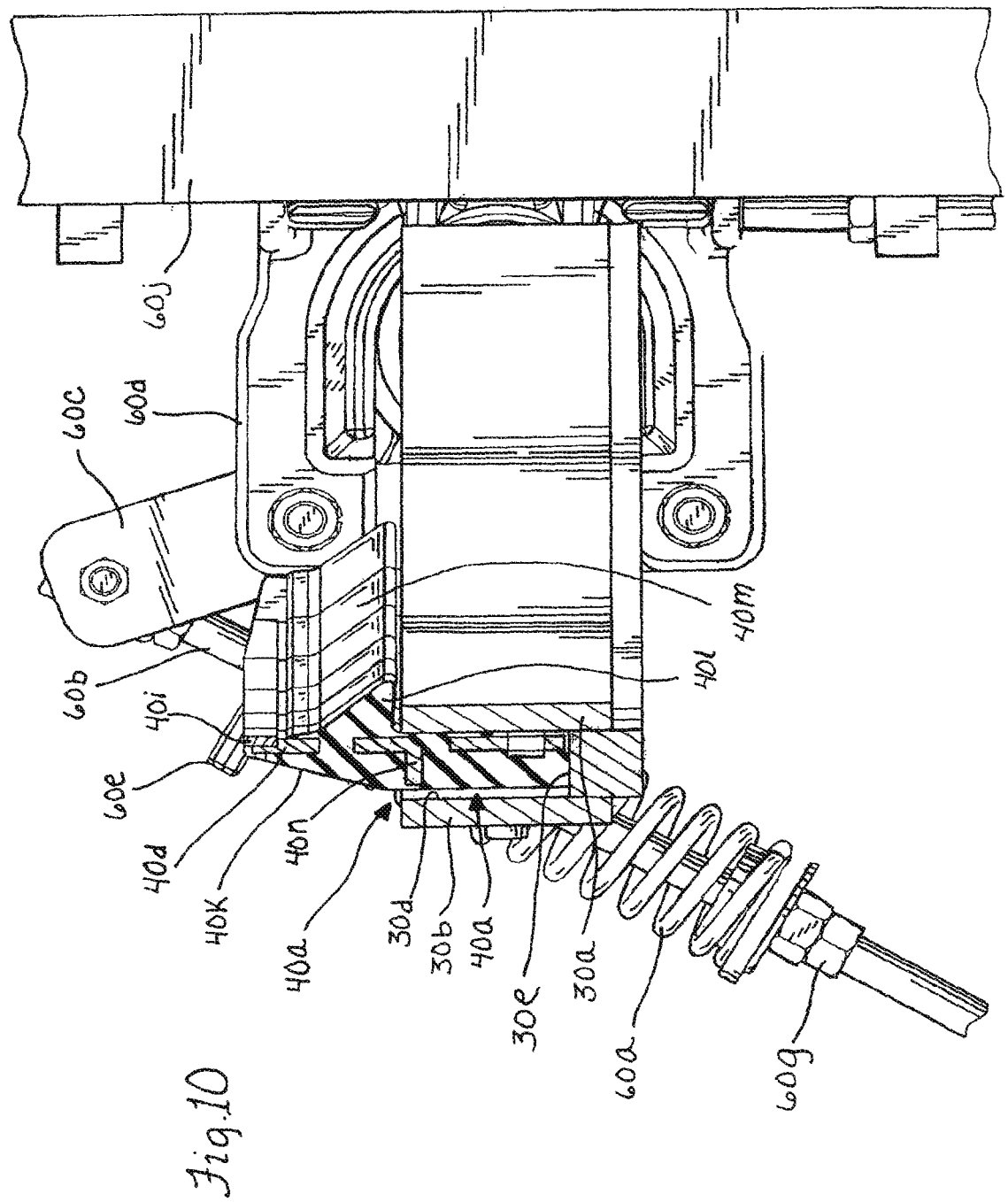
FIG. 10 is left side cross-sectional view of the belt scraper assembly of FIG. 1 showing the stiffener extending in a longitudinal direction of the belt.

In a preferred embodiment, such as illustrated in FIGS. 1-10, a belt scraper assembly 10 for cleaning a conveyor belt 20 is provided. The belt scraper assembly 10 includes a blade holder 30 for holding a scraper blade 40 in contact with the conveyor belt 20 for cleaning the belt, as shown in FIG. 2. As shown in FIG. 10, the blade holder 30 has front and rear walls 30a, 30b that are spaced generally in a longitudinal belt travel direction 20a from each other. The scraper blade 40 has a body 40a of resilient material sized and configured for being received in the blade holder 30 between front and rear walls 30a, 30b of the holder 30. A stiffener 40n in the blade body 40a of a stiffer material than the resilient blade body material extends generally in a longitudinal direction 20a to resist bending of the resilient scraper blade body 40a during scraping of the belt.

The main function of the stiffener 40n is to resist bending of the blade 40 during abrasion thereof on the belt 20. The stiffener 40n is preferably a small metallic tab 40p formed on a plate member 40d. The stiffener 40n increases the stiffness of the blade 40 without the addition of a significant amount of material through its interaction with the rear wall 30b of the holder 30 and through limiting the compression of the resilient body of the blade 40a. The tab 40p extends within the resilient body 40a of the blade 40 in a longitudinal direction 20a with respect to the travel of the belt 20. The end of the tab 40p reaches in relatively close proximity to the inner surface of the rear side wall 30d such that the tab is effectively supported by the rear side wall 30b when the belt 20 exerts a force on the blade 40 during scraping. Thus, the tab 40p resists bending of the blade through its interaction with the inner surface of the rear side wall 30d.

In addition, the tab 40p also prevents excessive compression of the resilient blade body 40a. The tab 40p is located near a middle portion of the blade 40, close to the upper end of the inner surface of the rear side wall 30d. When the blade 40 begins to bend due to scraping forces thereon, it will bend chiefly about the upper end of the of the rear wall 30b, which acts as a fulcrum. By locating the tab 40p close to the fulcrum, the resilient material 40e is kept from substantially compressing, because the tab 40p transmits the resistive force from the rear wall 30b to the plate 40d.

The longitudinal orientation of the tab 40p within the resilient material of the blade body 40e also acts to limit compression. The resilient material below the tab 40p in the lower portion of the blade body 40f provides support to the tab 40p, and in turn, the tab 40p provides support to the resilient material above the tab 40p in the upper portion of the blade 40g. Without the tab 40p, the resilient material in the upper portion of the blade 40g is especially prone to compression, as it is unsupported by the rear wall 30b. However, with the tab 40p present, the upper surface of the tab 40w provides a support to the resilient material that helps to limit compression.

As illustrated in FIGS. 1 and 2, the scraper assembly 10 includes a biasing support assembly 60 on either end of the of the blade holder 30 for biasingly supporting the blade 40 against the belt 20. The biasing support assembly 60 allows the scraper blade 40 and blade holder 30 to translate downwards or away from the belt by rotating about an axis of the blade holder pivot shaft 30c when the scraper confronts obstructions on the belt surface, such as belt splices and linkages or carry-back or leftover material that is sufficiently stuck to the belt 20 such that the blade's pressure on the belt is insufficient to remove the material. This biased engagement with the belt helps to prevent damage the blade 40 and the belt 20.

The biasing support assembly 60 includes a biasing member, such as a coil spring 60a disposed about a shaft 60b. The shaft 60b is pivotally connected to a linkage 60c that is connected to a blade holder support plate 60d. The spring 60a is biased between an arm 60e of a collar mount 60f and a compression adjustment member, such as a nut, 60g. The pressure exerted by the blade 40 on the belt 20 is adjusted by tightening or loosing the nut 60 to compress or decompress the spring 60a, wherein further tightening of the nut 60 causes the spring 60a to compress, causing the blade 40 to be pushed against the belt 20 with greater force. The collar mount 60f has set screws 60h for allowing adjustment of the position of the collar mount 60f on the blade holder pivot shaft 30c. The vertical position of the biasing support assembly 60 may be adjusted via the vertical adjustment assembly 60i, which is supported by a bracket, such as L-shaped bar 60j.

As shown in FIGS. 1, 2 and 10, the blade holder is preferably a rigid welded assembly that extends below and across the conveyor belt toward either side thereof and is connected to the biasing support assembly 60 on either end via blade holder pivot shafts 30c. As shown, the blade holder has a non-linear contour, such that the contour departs from a transverse orientation with respect to the belt at least partially along a length of the support member. In one preferred form, the blade holder 30 has an arcuate contour or a U-shape, such that the contour of the blade holder 30 extends partially in the return direction 20a as it approaches the center of the belt 20, and then returns partially in a direction opposite the return direction 20a as it extends towards the other end of the belt 20. In this configuration, the side walls 30a, 30b follow the arcuate contour and remain uniformly spaced apart throughout a length of the holder 30, such that the scraper blade 40 may be inserted between the side walls 30a, 30b. A lower base member of the blade holder assembly 30 provides an inner surface 30e for supporting the lower portion of the blade body 40f. The side walls 30a, 30b of the holder 30 and the lower base member create a channel for holding the scraper blade 40 therein. In an alternate embodiment, the blade holder 30 may have a linear contour, such that the blade holder 30 extends only transversely to the belt 20.

In a preferred embodiment, the scraper blade 40 is flexible, such that the scraper blade 40 may be flexed into the contour of the blade holder. In other forms, the blade 40 may be pre-shaped into the appropriate form to fit within the blade holder. Although the embodiments shown to describe the present invention show a holder 30 having an arcuate configuration, any non-linear or linear configuration could be used, such as a V-shape.

The blade holder 30 has inner surface portions 30d and 30e for providing the stiffener 40n with support to resist bending of the scraper blade body 40a. A portion of the stiffener is preferably located near an upper end of the inner surface portion 30d of the rear holder wall 30b. This location provides the stiffener 40n with a contact area for supporting the stiffener 40n to resist bending of the blade body 40a, as will be discussed in greater detail below.

As shown in FIGS. 3-6, the scraper blade 40 has a blade body 40a with front and rear sides 40b, 40c, and a thickness in the longitudinal belt travel direction 20a between the front and rear sides 40b, 40c. The blade body 40a is preferably formed from a resilient or flexible material 40e, such as 60 durometer rubber, and has a band-like shape, with a length that extends generally transversally to the longitudinal direction of the belt 20a. The scraper blade 40 is preferably flexible or resilient, such that it may be flexed into a non-linear orientation, such as one that corresponds with the contour of the blade holder 30.

The blade body 40a has a lower portion 40f that is sized and configured to be inserted in the blade holder 30, between the front and rear walls 30a, 30b. An upper portion 40g extends from the lower portion 40f, and includes a blade tip 40h for scraping the belt 20. The blade tip 40h preferably has a scraping portion including a carbide tip 40i, along the front edge of the blade tip 40h, with a trailing tip portion 40j adjacent the carbide tip 40i being composed of the flexible material 40e. With this configuration, the carbide tip 40i scrapes material off of the belt 20, while the trailing tip portion 40j is operable to squeegee or remove liquids from the belt 20.

As best shown in FIGS. 9 and 10, the upper portion 40g of the scraper blade 40 preferably has a trailing edge 40k that extends entirely within a longitudinal width of the blade holder 30, such that no portion of the blade 40 extends over any portion of the rear side wall 30b or contacts a top surface of the rear side wall 30b. Specifically, the trailing edge 40k extends downwardly and rearwardly from the blade tip 40h to the lower portion 40f of the blade body 40a, which is positioned adjacent the inner surface 30d of rear side wall 30b. The slope of the trailing edge 40k directs scraped material away from the blade holder 30 to help prevent bonding of the blade 40 to the holder 30.

The upper portion of the blade 40g may also include a deflector, such as a protruding ridge portion 40l disposed on a front side 40b of the scraper blade body 40a for directing scraped material away from the holder 30. The protruding ridge 40l keeps scraped material from depositing at the interface between the scraper blade body 40a and the blade holder 30. Such deposits are undesirable because they may cause the blade 40 to become lodged within the blade holder 30, making it very difficult to remove and replace the blade 40. In a preferred form, the ridge portion 40l projects over the front side wall 30a and has a sloped face 40m extending downward and away from the blade tip 40h for directing scraped material away from the blade holder 30. The ridge portion 40l is preferably integrally formed with the blade body 40a to simplify manufacture of the blade 40 and increase the durability and strength of the ridge portion 40l. Because the ridge 40l is integrally formed, the ridge is stronger and more durable than a separate deflector bonded to the blade with adhesive. However, in alternative forms, the blade may be provided with a non-integral deflector, or may omit a deflector entirely.

In the embodiments illustrated in FIGS. 5, 6, 9, and 10, the scraper blade 40 includes a rigid plate member 40d connected to the blade body 40a for providing structural rigidity to the blade body 40a. Each plate member 40d has an upper and lower edge with a length extending therebetween. A plurality of plate members 40d may be disposed on or within the resilient blade body 40a to add rigidity to the blade 40. The number of plates 40d used in the blade depends on the required width of the blade 40. As shown in FIG. 6, the blade 40 includes a plurality of plate members 40d oriented in a row edgewise and adjacent one another disposed within the blade body 40a. Thus, the plate members 40d are joined to one another via the flexible material 40e. The flexible material 40e fills gaps between the plates 40d, which allow the blade body 40a to be flexed.

In a preferred form shown in FIGS. 7-10, a stiffener 40n is disposed in the blade body 40a. The stiffener 40n is made of a stiffer material than the resilient blade body material and extends in a longitudinal direction to resist bending of the resilient scraper blade body 40a during scraping of the belt 20. In a preferred form, each plate member 40d includes a stiffener 40n in the form of a generally rectangular tab portion 40p of the plate member 40d bent in the longitudinal direction 20a, such that the tab 40p is transverse to the length of the plate member 40d. The tab portion includes a surface portion 40q for receiving support from an inner portion of the side wall 30d. In addition, a tab portion receives support from the resilient material 40e positioned below the lower surface 40v of the tab. Specifically, when the blade 40 is in bending, the tab 40p will tend to translate in a generally clockwise direction as shown in FIG. 9, and the lower surface 40v will urge against the resilient body of material 40e adjacent the tab 40p in the lower portion 40f of the blade body 40a. The resilient material 40e, supported by inner surface 30e of the blade holder 30, will provide support to the tab 40p, which will help prevent bending of the blade. In addition, the resilient material 40e located above the tab 40p is similarly supported by the upper surface 40w of the tab. Thus, the blade 40 receives support to resist bending from the interaction between the tab member 40p, the resilient material 40e, and the inner surfaces of the holder 30d and 30e.

Preferably the tab portion 40p is formed from an interior portion of the plate member 40d, which is formed or cut during manufacture of the plate member 40d. The tab portion 40p is disposed centrally on the plate member 40d at a position between the tip and the base such that the longitudinal extending portion of the tab 40p is at a height near the upper portion of the rear wall of the holder 30b, as best shown in FIG. 10. In this orientation, the tab 40b is effective to increase the stiffness of the blade 40 and thereby keep the blade 40 from bending excessively.

The tab 40p effectively decreases the amount of compression of the blade body 40a by decreasing the amount of compressible space between the plate 40d and the rear wall 30b. As the blade 40 is bent due to its interaction with belt 20, the rear wall 30b acts as a fulcrum to the blade 40, and the tab 40p provides support to the plate member 40d as the rear surface of the blade body 40a adjacent the surface portion 40q is biased against the inner surface of the rear wall 30d. Consequently, a force-transmitting interface is formed between the surface portion 40q of the tab 40p and the inner wall 30d of the holder 30. A layer of flexible material 40e may be positioned between the surface portion 40q and the inner surface 30d to prevent wear. Although the stiffener 40n is shown as being integral with the plate 40d, the stiffener 40n may also be provided separately from the plate member 40d, or may be connected to the blade holder 30. The stiffener 40n reduces bending of the blade 40 without any of the positional problems related to a mass of resilient material overhanging the side wall of the holder, which as discussed, must be precisely located to overhang and contact the upper surface of the side wall to function properly.

To manufacture the scraper blade 40, the plate members 40d are inserted into a die and a resilient material, such as uncured rubber, is injected into the die to form the flexible body 40a of the blade 40. The rubber covers over at least a portion of the plate members 40d, and the plate members 40d are preferably embedded therein. The rubber is then cured to harden the rubber. In one form shown in FIGS. 5-9, an aperture 40r is disposed in the plate member 40d for allowing the resilient material to pass through the plate member 40d during manufacture of the scraper blade 40d. The aperture 40r in the plate member allows the resilient material to flow through the plate to the other side of the blade 40, which helps to evenly distribute the resilient material throughout the die. In addition, an aperture 40s may be provided in the plate member 40d for accepting a protrusion of the die for aligning the plate 40d within the die. In this manner, the plates 40d will be properly aligned within the blade body.

The carbide blade tip 40i may be fixed to the plate 40d by various known methods, such as brazing. However, brazing may cause stress concentrations in the plate 40d and carbide tip 40i, due to the thermal expansion, and subsequent contraction thereof during cooling. To help reduce such stress concentrations to prevent cracking of the carbide blade tip 40i, the plate member 40d of FIG. 7 has a gap or notch 40t in an upper portion of the plate 40d extending from an upper edge of the plate 40d towards a lower edge of the plate 40d. The carbide tip 40i is then connected along an upper edge of the plate 40d such that the tip 40i extends across the gap 40t. In one form, the gap 40t is in communication with the aperture 40r. However, in an alternate embodiment, the gap 40t need not extend to the aperture 40r. Alternatively, the aperture 40r may be omitted, and the gap 40t may allow the resilient material 40e to flow through the plate 40d during manufacture of the blade 40. Other orientations, shapes, and sizes of the notch or gap 40t may be implemented, as would be apparent to those skilled in the art.

While the invention has been described with respect to specific examples including presently preferred modes of carrying out the invention, those skilled in the art will appreciate that there are numerous variations and permutations of the above described systems and techniques that fall within the spirit and scope of the invention as set forth in the claims.

What is claimed is:

1. A belt scraper assembly for cleaning a conveyor belt, the belt scraper assembly comprising:
    a blade holder;
    front and rear walls of the holder generally spaced in a longitudinal belt travel direction from each other;
    a scraper blade having a body of resilient material sized and configured for being received in the blade holder between the front and rear walls thereof; and
    a plate member connected to the scraper blade body wherein the plate member has a gap in an upper portion of the plate member extending from an upper edge of the plate member towards a lower edge of the plate.

2. The belt scraper assembly of claim 1, wherein the holder walls have upper ends, and a stiffener extends in the longitudinal direction in the blade body in the holder adjacent the upper ends of the holder walls with the scraper blade received in the blade holder.

3. The belt scraper assembly of claim 1, wherein the blade body includes an upper portion thereof extending beyond the holder walls with the blade received in the holder, and the upper portion includes an inclined, rear surface that does not protrude rearwardly beyond the rear wall of the holder.

4. The belt scraper assembly of claim 1, wherein the plate member extends in a generally vertical direction with the scraper blade received in the holder.

5. The belt scraper assembly of claim 3, wherein the upper portion includes a forward protruding ridge portion disposed on a front portion of the scraper blade body for directing scraped material away from the holder.

6. The belt scraper assembly of claim 1, further comprising a blade tip connected to the upper portion of the plate member and extending across the gap.

7. A belt scraper assembly for cleaning a conveyor belt, the belt scraper assembly comprising:
    a blade holder;
    front and rear walls of the holder generally spaced in a longitudinal belt travel direction from each other;
    a scraper blade having a body of resilient material sized and configured for being received in the blade holder between the front and rear walls thereof; and
    a stiffener in the blade body of a stiffer material than the resilient blade body material with the stiffener extending in the longitudinal direction to resist bending of the resilient scraper blade body during scraping of the belt,
    wherein the rear wall has an inner surface portion adjacent to a rear end of the stiffener with the blade received in the holder for providing the stiffener with support to resist bending of the resilient scraper blade body.

8. The belt scraper assembly of claim 7, wherein the rear end of the stiffener is adjacent to and below an upper end of the inner surface portion of the rear holder wall.

9. A scraper blade for scraping a conveyor belt, the scraper blade comprising:
    a body of resilient material of the scraper blade;
    a base portion of the scraper blade body for being inserted within a blade holder;
    an upper portion of the scraper blade body extending from the base portion toward the conveyor belt;
    a rigid plate member of the scraper blade connected to the scraper body having a base portion and a tip portion and a length extending between the base and tip portions; and
    a gap in the tip portion of the rigid plate member extending lengthwise from an upper edge of the rigid plate member tip portion down toward a lower edge of the rigid plate member base portion.

10. The scraper blade of claim 9, wherein the scraper blade comprises a plurality of rigid plate members interconnected via the resilient material, such that the scraper blade may be flexed to follow a contour of the blade holder.

11. The scraper blade of claim 9, wherein a stiffener is disposed on the rigid plate member between the base and tip portions thereof.

12. The scraper blade of claim 11, wherein the stiffener is a tab portion disposed on the rigid plate member extending in a direction transverse to the length of the plate member.

13. The scraper blade of claim 9, further comprising a ridge portion extending along a length of the scraper blade having a sloped face extending downward and away from the upper portion of the scraper blade for directing scraped material away from the blade holder.

14. The scraper blade of claim 13, wherein the ridge portion is made of the resilient material.

15. The scraper blade of claim 14, wherein the ridge portion is disposed on an upstream side of the scraper blade body.

16. The scraper blade of claim 9, further comprising a rigid scraper tip for scraping the belt disposed on an upstream side of the scraper blade body, extending across the gap in the rigid plate member tip portion, and supported by the rigid plate member.

17. A scraping assembly for a conveyor belt comprising:
    a blade holder extending across the conveyor belt toward either side thereof, wherein the blade holder has a non-linear contour that departs from a transverse orientation with respect to the belt at least partially along a length of the support member;
    front and rear walls of the blade holder;
    a scraper blade for cleaning the belt having a length that follows the arcuate contour of the blade holder when received thereby;
    a tip portion of the scraper blade for scraping the belt;
    a base portion of the scraper blade extending up relative to the support member toward the conveyor belt and being received by the blade receiving portion;
    a plurality of rigid plate members of the scraper blade each having a base portion and a tip portion and a length extending between the base and tip portions;
    a stiffener disposed on the plate members between the base and tip portions extending generally transversely with respect to the length of the plate;
    a resilient material disposed on the plurality of rigid plate members such that the plate members are flexibly interconnected thereby; and
    a force-transmitting interface between the stiffener and an inner surface of the rear wall such that the inner surface of the wall offers support to the stiffener to oppose bending of the scraper blade caused by scraping the belt.

18. The scraping assembly of claim 17, wherein a portion of the resilient material is disposed between the stiffener and the inner surface of the rear wall.

19. The scraping assembly of claim 17, wherein the stiffener is a tab portion of the rigid plate member and extends in a return direction toward the rear wall.

20. The scraping assembly of claim 17, further comprising a ridge portion extending along a length of the scraper blade having a sloped face extending downward and away from the blade tip portion for directing scraped material away from the support member.

21. The scraping assembly of claim 20, wherein the ridge portion comprises the resilient material and is integrally disposed on the scraper blade.

22. The scraping assembly of claim 21, wherein the ridge portion is disposed on an upstream side of the scraper blade.

* * * * *